Sept. 4, 1951           E. R. PRICE           2,566,631

CLUTCH CONTROL MECHANISM

Filed Sept. 13, 1947           3 Sheets-Sheet 1

INVENTORS
EARL R. PRICE
BY H.O. Clayton
ATTORNEY

Sept. 4, 1951          E. R. PRICE          2,566,631

CLUTCH CONTROL MECHANISM

Filed Sept. 13, 1947          3 Sheets-Sheet 3

INVENTOR
EARL R. PRICE
BY H. O. Clayton
ATTORNEY

Patented Sept. 4, 1951

2,566,631

UNITED STATES PATENT OFFICE 2,566,631

CLUTCH CONTROL MECHANISM

Earl R. Price, South Bend, Ind., assignor to Bendix Aviation Corporation, South Bend, Ind., a corporation of Delaware Application September 13, 1947, Serial No. 773,837

5 Claims. (Cl. 192—.076)

This invention relates in general to power means for operating the friction clutch of an automotive vehicle and in particular to pressure differential operated power means controlled by an operation of the accelerator of the vehicle and by an operation of the engine of the vehicle.

One of the principal objects of my invention is to provide a clutch control mechanism including a pressure differential operated motor controlled by valve mechanism including a three-way pressure balanced follow-up valve which is operative in accordance with the position of the accelerator and the speed of the engine.

Another object of my invention is to provide, in the power plant of an automotive vehicle including a friction clutch, a change speed transmission and an accelerator, a vacuum operated clutch control mechanism comprising a single acting motor, said motor being controlled by a pressure balanced three-way valve which is actuated, through the intermediary of a floating lever, by the accelerator and a pressure differential and spring operated motor, the operation of the latter being controlled by means including an engine operated water pump.

Yet another object of my invention is to provide power means for operating the friction clutch of an automotive vehicle said power means serving to effect two stages of clutch engaging movement of the driven element of the clutch as it moves into engagement with the driving element of the clutch said two stage operation of the clutch driven element being effected by a throttle opening movement of the accelerator and by engine speed controlled means.

A further object of my invention is to provide, in an automotive power plant including a friction clutch and a change speed transmission, a clutch control mechanism including a motor and valve means for controlling the operation of said motor, said valve means comprising an accelerator and engine controlled three-way valve and a cut off valve, the latter valve serving to disable the operation of the former valve when the transmission is established in its high gear setting.

Yet another object of my invention is to provide, in the power plant of an automotive vehicle including a friction clutch, an accelerator and a three speeds forward and reverse transmission, power means for operating the clutch including a pressure differential operated motor operatively connected to the clutch, valve means for controlling the operation of said motor including a three-way valve controlled by a vehicle speed responsive governor, the accelerator and the change speed transmission, and further including another three-way valve controlled by the accelerator and a plurality of pressure differential operated motors; said power means being operative to disengage the clutch by the release of the accelerator when the transmission is established in any gear except high gear and also operative to disengage the clutch, when the transmission is established in high gear, by an operation of the governor and the accelerator.

Yet another object of my invention is to provide a clutch control mechanism adapted to be used in the power plant of an automotive vehicle, said mechanism including a pressure differential operated motor controlled by valve mechanism which is automatically operative to effect a clutch plate loading operation of the clutch control mechanism the degree of loading being dependent upon factors including the position of the accelerator and the speed of the engine of the vehicle, the mechanism being automatically operative to quickly and substantially increase the loading of the clutch plates when the engine speed is increased to or above a certain factor.

The above and other objects and features of the invention will appear more fully hereinafter from a consideration of the following description taken in connection with the accompanying drawings wherein two embodiments of the invention are illustrated by way of example.

Figure 1:
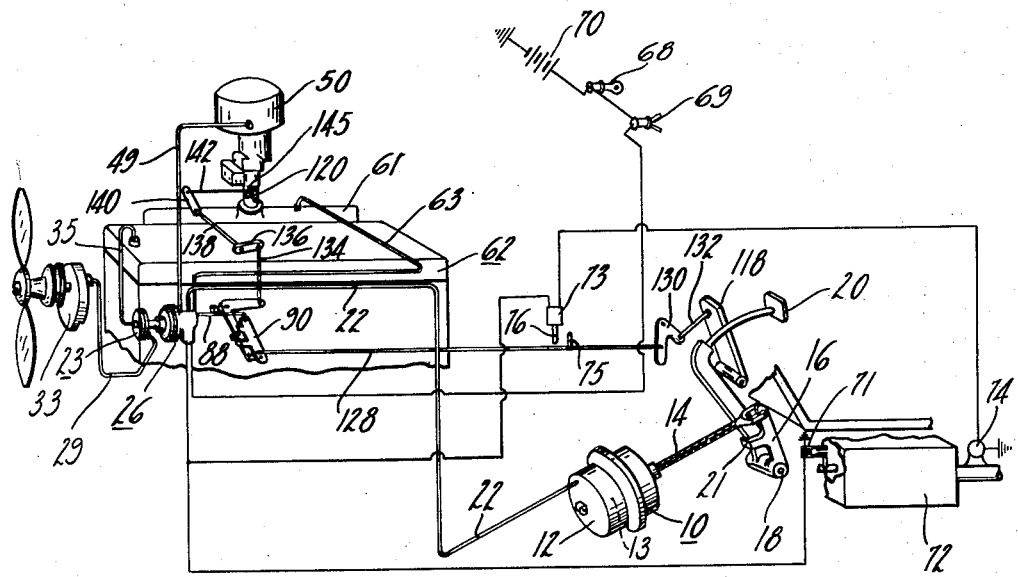
Figure 1 is a diagrammatic view disclosing the principal features of my invention.

Describing now that embodiment of my invention disclosed in Figures 1 to 5 inclusive of the drawings, the principal elements thereof consist of a single acting vacuum motor 10 comprising a casing 12 and a power element such as a piston, not shown, which is connected to a friction clutch, not shown, of a conventional design. One end of the casing of the motor, a portion of the body thereof and the power element together outline a control chamber 13, the gaseous pressure within said chamber being controlled to control the operation of the motor. The force transmitting means interconnecting the power element of the motor with the clutch preferably includes a flexible cable 14 connected to a crank 16; and said crank is fixedly connected to a shaft 18 which is connected to the clutch. A foot operated clutch pedal 20, contactable with a flange 21 extending from the crank 16, is also preferably included in the clutch operating mechanism. The connection between the pedal 20 and the crank 16 provides a means for effecting a manual operation of the clutch; and the lost motion connection between the pedal 20 and crank 16 makes possible a power operation of the clutch without moving the clutch pedal.

Figure 3:
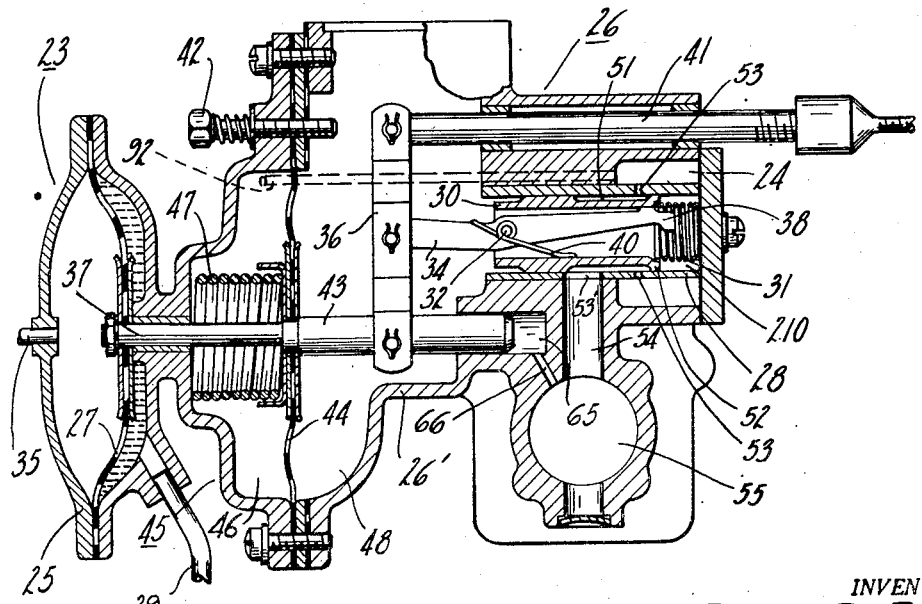
Figure 3 is a longitudinal sectional view taken on the line 3—3 of Figure 2 of the control valve mechanism of my invention.
Figure 2:
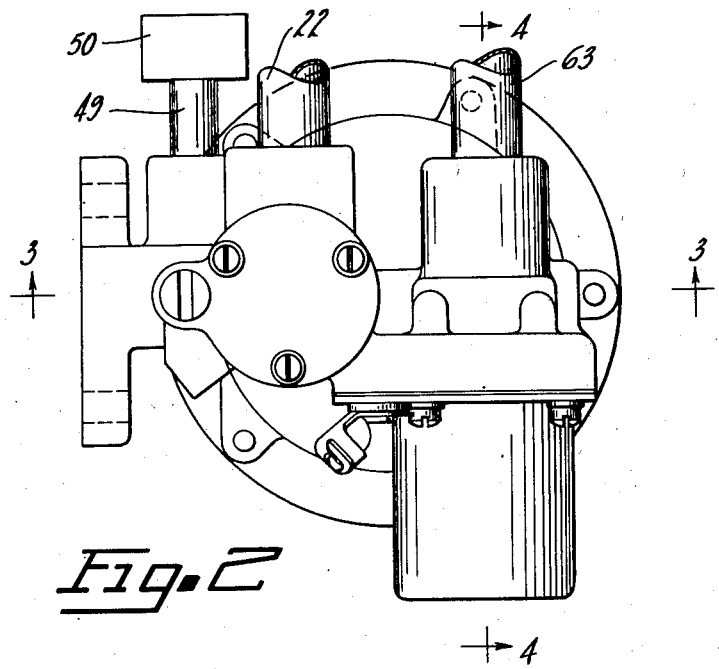
Figure 2 is a plan view looking at one end of the valve mechanism of my invention.
Figure 4:
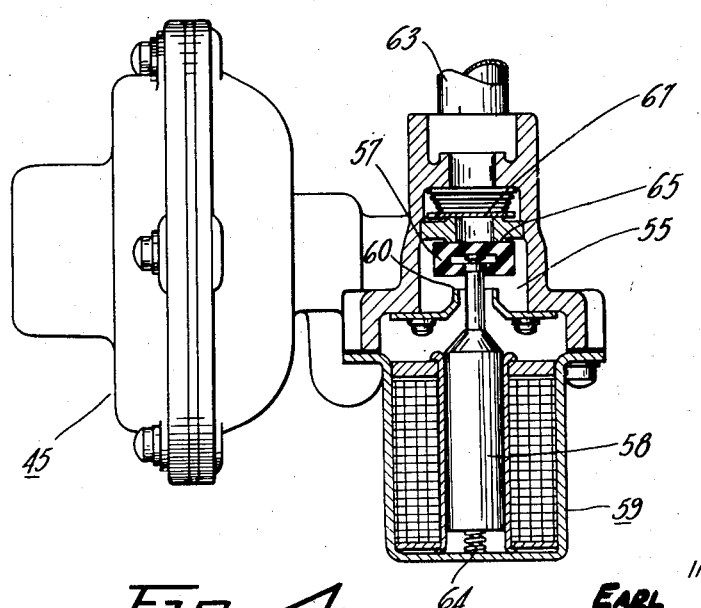
Figure 4 is a view partly in section, taken on the line 4—4 of Figure 2 disclosing details of the solenoid operated vacuum cut-in valve of the valve mechanism.

One end of the motor 10, that is, the end of the same constituting a part of the aforementioned power compartment 13 of the motor, is connected by a conduit 22 to a compartment 24 of a control valve unit indicated as a whole by the reference numeral 26 and three different views of said unit are disclosed in Figures 2 to 4 inclusive. The casing 26' of the unit 26 is provided with a cylindrically shaped bore to receive a cylindrical sleeve valve member 28 constituting one of the two parts of a three-way valve; and said casing is counterbored to provide the aforementioned compartment 24, Figure 3.

A valve member 30, which is biased inwardly by a spring 31 and which is provided with a cylindrically shaped bore to permit the passage of air therethrough, constitutes the other part of the two part three-way valve. One end of the latter valve member, is provided with diametrically spaced openings to receive therethrough a pin 32 and said pin extends through a connecting pin 34, one end of which extends within the member 30. The other end of the pin 34 extends beyond the valve member 30 and is detachably and pivotally connected to a two-part lever 36. The end portion 38 of the pin 34 is preferably biased into engagement with the interior of the valve 30 by a coil spring 40. There is thus provided means for readily disconnecting valve 30 from the lever 36; for the pin 32 may be removed by driving the same through the pin 34, thereby separating the latter from the valve 30.

As is disclosed in Figure 3, the lever 36 is pivotally connected at one of its ends to a rod 41; and the movement of the rod to the left, Figure 3, is limited by a stop 42 adjustably mounted in the valve casing. The other end of the lever 36 is pivotally connected to a pin 43 which is slidably received at one of its ends in a portion of the valve casing and which is secured at its other end to a flexible diaphragm 44. This diaphragm constitutes the power element of a valve operating pressure differential operated motor indicated as a whole by the reference numeral 45; and the operation of said motor is in large measure controlled by the gaseous pressure within the control compartment 46 of said motor, and by a compression spring 47 within said compartment. A compartment 48 of the motor 45 is vented to the atmosphere via a conduit 49 which leads to an air cleaner 50, Figure 2.

The most important feature of my invention lies in the provision of a fluid pressure operated motor 23 which cooperates with the motor 45 and the accelerator 118 in the control of the valve 30. This motor 23 includes a two part casing 25 and a power element 27, one of the casing parts receiving a conduit 29 which is preferably connected to the high pressure side of a water pump 33 constituting a part of the cooling system of the internal combustion engine 62 of the vehicle. The other part of the motor casing is ported to receive a conduit 35 which may be connected to the low pressure side of the pump system. The power element 27 of the motor 23 is connected to the power element of the motor 45 by a rod 37.

Describing the operation of the motor 23 the differential of pressures to which the power element 27 is subjected is directly proportional to the speed of the engine 62; for the pump 33 is driven by said engine. Now the power element 27 is connected to the valve operating diaphragm 44, accordingly it is apparent that the loading of said diaphragm is in part controlled by the loading of the power element 27; and this feature of my invention will be brought out in the description to follow.

Continuing the description of the valve mechanism 26, the valve member 30 is recessed at 51 and the end of said member provides a land portion 52 which is adapted, in the operation of the valve, to be positioned to register the recess 51 with ports 53 in the valve member 28. The member 30 is also operated so that the land portion 52 covers the ports 53, that is, laps the valve; and said member is also operated to interconnect said ports with the air cleaner 50 via the compartment 48 and the interior of the valve.

The valve member 28 is provided with an opening 53' to register with one end of a duct 54 in the valve casing, said duct registering at its other end with a chamber 55 of a three-way vacuum cutin valve indicated as a whole by the reference numeral 56 and disclosed in detail in Figure 4. The latter valve includes a valve member 57 secured to one end of an armature 58 of a solenoid 59. When the solenoid 59 is energized the valve member 57 moves downwardly, Figure 4, to seat at 60, thereby connecting the duct 54 with the intake manifold 61 of the internal combustion engine 62 of the vehicle via a conduit 63 and the aforementioned chamber 55; and when the solenoid 59 is de-energized, a spring 64 serves to move the armature upwardly, Figure 4, to seat the valve member 57 at 65, thereby cutting off the vacuum connection and venting the duct 54 to the atmosphere via the air cleaner 50, chamber 48 of the motor 45, a recess 65 in the valve casing which houses the outer end of the pin 43, a duct 66 in the valve casing, and the chamber 55. A spring loaded check valve 67 may be included in the vacuum connection between the intake manifold and the valve chamber 55 thereby providing a means for maintaining the clutch disengaged in the event the conduit 63 is broken when the motor 10 is energized.

Completing the description of the valve unit 26 the casing 26' is provided with a duct 92, Figure 3, permanently interconnecting the control compartment 46 of the motor 45 with the aforementioned valve compartment 24. There is thus provided fluid transmitting means for at all times interconnecting the motor compartment 46, the valve compartment 24, and the control compartment 13 of the clutch operating motor 10. It follows therefore that the operation of the clutch control mechanism constituting my invention is controlled by controlling the gaseous pressure within the valve compartment 24.

There is thus provided a compact valve control unit 26 comprising a multi-sectioned casing housing a three-way control valve 28, 30 and means for operating said valve comprising the fluid pressure motor 23, a spring and pressure differential operated motor 45 and an accelerator operated pin 41, said pin and the power element 44 of the motor being connected with the movable part 30 of said valve by means of a floating lever member 36.

Describing now the force transmitting means interconnecting the accelerator 118 of the car with a throttle operating crank 120 and with the valve operating pin 41, said pin is connected to a rod 88 and this rod is pivotally connected with a lever member 90. The lower end of this lever member is pivotally mounted upon a floating pin 122 and one end of this pin is mounted in one end of a bell crank lever 124 which is pivotally mounted upon a fixed pin 126. The lever member 90 is connected to the accelerator 118 by means of a rod 128, a bell crank lever 130 and a link 132 all as disclosed in Figure 1; and as disclosed in the latter figure, the bell crank lever 124 is connected to the throttle valve of the carburetor by means of a link 134, a crank 136, a rod 138, a crank 140, a link 142 and the crank 120. A spring 144, which is weaker than a throttle return spring 145, is operative, together with the spring 145, to return the accelerator to its throttle closed position and to move the valve member 30 to the right, Figure 3, to open the three-way valve 28, 30, that is, operate the same to effect a clutch disengaging operation of the motor 10. The spring 144 is preferably sleeved over the pin 122 and is connected at its ends to the levers 90 and 124. The operation of this part of the mechanism of my invention will be described in greater detail hereinafter when the operation of the entire clutch control mechanism is described in detail.

Describing now an important feature of my invention, the solenoid 59 which operates the vacuum cutin valve 56, is controlled by the electrical controls disclosed in Figure 1. Describing this mechanism a grounded battery 70 is wired in series with an ignition switch 68, a clutch control cutout switch 69 preferably mounted in the instrument panel of the vehicle, the solenoid 59, and a grounded switch 71 which is opened by the second and high gear shift rail of the transmission 72 when the transmission is established in its high gear setting. With this electrical hookup the valve 56 is opened, that is, the valve member 57 is seated at 69, when the switches 68 and 69 are closed and the transmission is established in any gear except high gear; accordingly, with the vacuum cutin valve opened there is provided a source of vacuum to make possible a clutch disengaging operation of the motor 10 when the accelerator is released to open the valve 28, 30 an operation which is described in detail hereinafter.

With the vehicle traveling in high gear it is desirable to automatically disengage the clutch when the accelerator is released and the speed of the vehicle is appreciably reduced, for example when the vehicle is being driven very slowly in traffic or in a funeral procession; and to effect this operation of the mechanism of my invention there is provided a switch 73 which is closed when the accelerator is released to close the throttle, and a grounded switch 74 which is operated by a vehicle speed responsive governor, not shown. To effect the operation of the switch 73 there is provided a flange 75 on the rod 128, said flange being contactable with a switch operated member 76.

As is disclosed in Figure 1 the switches 74 and 73 are electrically connected in series in an electrical circuit which is wired in parallel with the grounded transmission operated switch 71. Preferably the switch 73 is so constructed and so operated by the flange 75 that the same is closed just prior to the complete closing of the throttle valve; and it follows, therefore, that the switch 73 is not opened until after the throttle has been opened to a limited degree.

The above described clutch control mechanism of my invention may be incorporated in the power plant of a vehicle which includes a kickdown type of selective gear transmission, that is, a transmission which may, by manual operation of a shift lever, be established in one or the other of two forward gear settings and a reverse gear setting; and after one of said forward gear settings is established then a pressure differential and spring operated kickdown motor unit, controlled by a vehicle speed responsive governor and the accelerator of the vehicle, takes over the operation of said transmission. In this type of well known transmission mechanism the kickdown or downshift operation of the motor unit is facilitated by a momentary disabling of the ignition system of the engine; and the power plant including such a mechanism may also include a fluid coupling.

Figure 5:
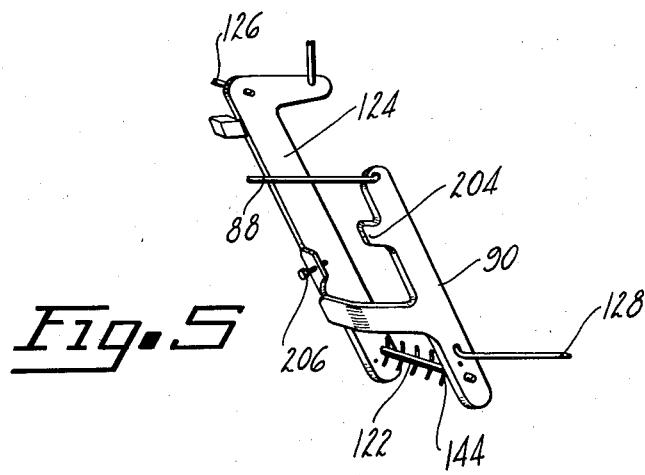
Figure 5 is a view disclosing the principal parts of the connection interconnecting the accelerator, the throttle and the control valve.

Describing now the complete operation of the mechanism constituting my invention and incidentally completing the description of the parts thereof not heretofore described, when the accelerator 118 is completely released to idle the internal combustion engine 114 and move the lever 90 to the position disclosed in Figure 5, the intake manifold 112 of said engine is partially evacuated. There is thus provided a source of vacuum for energizing the motor 10 to disengage the friction clutch of the motor vehicle; and this operation is effected inasmuch as with the release of the accelerator the movable three-way valve member 30 is moved to place said motor in air transmitting connection with the manifold. The valve member 30 and the means for operating the same then assume the relative positions disclosed in Figure 3, the spring 47 being compressed by the joint operation of the power elements 27 and 44 both of which are at the time subjected to differentials of pressure developed by the idling engine. Air is then withdrawn from the clutch motor and the motor compartment 46 into the intake manifold via the conduit 63, the valve compartment 55, the duct 54 interconnecting the compartment 55 with the port 53', Figure 3, recess 51, ports 53, the compartment 24, the duct 92 interconnecting the compartment 24 with the valve motor compartment 46, and the conduit 22 interconnecting the compartment 24 with the control chamber of the clutch motor 10.

The compartment 46 being then partially evacuated the diaphragm 44 is moved, by the differential of pressures acting on the same, to the position disclosed in Figure 3; for the gaseous pressure within the compartment 46 is at this time the same as that within the intake manifold of the idling engine and this gaseous pressure is of course the same as that within the control compartment of the then energized clutch operating motor 10; and as described above the engine idling position of the diaphragm 44 is at this time controlled in part by the operation of the power element 27. It is to be noted that in the clutch disengaged position of the parts the valve member 30 is moved to the position disclosed in Figure 3, that is, a position just short of a closing off of the ports 53 by the flanged end of said valve member, that is, the land 52.

Now it is to be noted that the air transmitting connection with the intake manifold is made possible by virtue of the fact that the valve member 57 of the vacuum cutin valve unit 56 is at the time removed from a seat 65; for the solenoid 59 which actuates said valve member is at the time energized to move the armature 58 and the valve member 57 connected thereto downwardly, Figure 4. Explaining this operation the solenoid 59 is at this time energized by virtue of a closing of the grounded breaker switch 74; for inasmuch as the car is at a standstill the vehicle speed responsive governor, not shown, is then operative to close said switch. The governor is so constructed that when the vehicle is at a standstill or is traveling below a relatively low speed, say ten miles per hour, then the governor is operative to close the grounded switch 74 thus completing an electrical circuit including the switch 74, the then closed accelerator operated switch 73, the solenoid 59, the cutout switch 69, the ignition switch 63 of the vehicle and the grounded battery 70.

Continuing now the description of the cycle of clutch control operations of the motor 10, said motor having been energized to disengage the clutch the driver will then probably wish to establish the change speed transmission of the vehicle in a relatively low gear setting. This is, of course, done by moving the transmission controlling selector lever, not shown, to its low gear position.

Continuing now the description of the cycle of operations of the clutch control mechanism, the power plant of the vehicle is now prepared to effect a forward movement of the vehicle accordingly the driver depresses the accelerator to open the throttle and effect a clutch engaging operation of the clutch operating power means. Describing the latter operation with the first increment of movement of the accelerator the lever 90 is rotated counterclockwise about the pin 122 as a fulcrum, this operation being made possible by virtue of the fact that the spring 144 is weaker than the throttle spring 145 and the latter spring is strong enough to prevent the rotation of the lever 124. In this operation the lever 90 moves counterclockwise until a flange 204 at the upper end of the same contacts an adjustable stop 206 on the lever 124; and this movement of the lever 90 results in a movement of the rod 88 to the left, Figure 3, to rotate the lever member 36 about its pivotal connection with the pin 43 as a fulcrum. The valve member 30 is thus moved to the left, Figure 3, the lever 36 operating as a lever of the second class to place the valve ports 53 in communication with a valve chamber 210 which chamber is at all times connected to the atmosphere via the interior of the valve member 30 and the valve compartment 48 which is vented to the atmosphere via the air cleaner 50. It is to be noted that in this initial operation of the valve the degree of movement of the valve member 30 is greater, preferably about twice as great, as the degree of movement of the rod 128 connected to the accelerator. As will be brought out in the description that follows there is thus provided a valve operating mechanism operative to quickly effect the first stage operation of the motor 10 during the first increment of depression of the accelerator, said increment being relatively small. It is to be remembered that there is neither an opening of the throttle nor an opening of the switch 73 during this movement of the accelerator.

The valve member 30 having been moved to the left to vent the valve compartment 24 to atmosphere there results a relatively rapid flow of air into both the control compartment 13 of the clutch operating motor 10 and the compartment 46 of the valve operating motor 45; and this flow of air results in a clutch engaging operation of the motor 10. Describing this operation the power element of the motor 10 is moved to the right, Figure 1, by the clutch springs and when said springs have expanded sufficiently to bring the clutch plates just short of engagement with each other, the movement of the power element is arrested.

Explaining this arresting operation the clutch springs, by their expansion, serve to maintain a relatively low gaseous pressure, that is vacuum, within the control chamber 13 of the motor 10. Now inasmuch as said control chamber is at all times connected to the valve chamber 24 and motor chamber 46 it follows that the gaseous pressure within said chambers is also maintained relatively low by virtue of the expansion of the clutch springs. As described above, when the clutch springs have expanded a certain amount, that is, when their vacuum creating power has decreased to a certain factor, then the spring 47 expands to the right, Figure 3, thereby lapping the three-way valve 28, 30. Describing this operation of said valve the valve member 30 moves to the right until the ports 53 register with the land portion 52 of said valve member; and when this occurs the flow of air into the chamber 46 and the motor 10 is automatically cut off and the system is then in equilibrium.

In this operation the lever 90 rotates counterclockwise about the pivotal connection between the pin 122 and said lever, said pivotal connection acting as a fulcrum. As stated above, the parts of the mechanism of my invention are so constructed and arranged, particularly the strength or load of the clutch springs, the area of the diaphrams 27 and 44 and the weight of the spring 47, that the valve is lapped to arrest the movement of the power element of the clutch motor when the clutch plates are just short of contact with each other.

This operation of the motor 10 is usually described as the first stage operation thereof and it is to be particularly noted that by varying the weight of the spring 47 or by varying the area of the piston 27, that the termination of the first stage operation of the motor may be varied. In other words, by varying the weight of the spring 47 there is provided means for varying the degree of separation of the clutch plates when the first stage of clutch engaging operation of the motor 10 is completed. It is to be noted the mechanism of my invention is preferably so constructed that this first stage of clutch engaging operation of said motor is completed before or at substantially the same time as the opening of the throttle is initiated and as a result of a relatively small degree of depression of the accelerator. This first stage operation of the motor 10 is completed very quickly and with a normal operation of the accelerator the driver may momentarily arrest the depression thereof when the resistance of the throttle return spring 145 is encountered; and this momentary arresting of the depression of the accelerator will suffice to insure a completion of the aforementioned first stage of clutch engaging operation of said motor before the throttle is opened.

To effect the step by step second stage of clutch engaging operation of the motor 10 the driver continues the depression of the accelerator thereby effecting a clockwise rotation of the bell crank lever 124 to open the throttle; and this operation of the accelerator serves to again effect a leftward movement of the rod 88 and a leftward movement of the valve member 30 the lever 36 again fulcruming about its pivotal connection with the pin 43. This operation, as with the above described first stage clutch engaging operation of the motor, serves to again place the clutch motor compartment 46 and the control compartment of the clutch motor 10 in communication with the atmosphere, thereby decreasing the gaseous pressure therein. The clutch springs then automatically resume their expansion to force the clutch plates into contact with each other. As before, if the driver arrests the movement of the accelerator after this resumption of movement of the valve member 30 said member again moves to its lapped position by virtue of a resumption of the expansion of the spring 47. In this valve lapping operation the direction of movement of the valve member 30 is again reversed; the lever 36 fulcruming about its connection with the pin 41. As with the above described first stage of clutch engaging operation of the mechanism the spring 47 expands to move the valve member 30 to its lapped position when the differential of pressure acting on the diaphragm 44, offset by the differential of pressures acting upon the power element 27, is reduced to a certain factor by the flow of air into the chamber 48. As with the first stage operation of the mechanism, the valve is lapped when the summation of forces biasing the pin 43 to the left equals that biasing said pin to the right.

The clutch plates are thus first moved just short of engagement with each other and then pressed into contact, said latter operation being effected by a succession of steps if the driver chooses to depress the accelerator by a succession of steps; and he will probably do this if he desires to effect a slipping operation of the clutch. The latter operation is, of course, necessary in effecting a very slow movement of the car such as when parking the same. The first stage operation of the mechanism, that is, the operation to effect the relatively rapid movement of the clutch plates up to a point just short of engagement with each other, will, by virtue of the relatively fast movement of the valve member 30 and its degree of movement during the initial increment of movement of the accelerator, be effected very quickly. The second stage clutch engaging operation of my clutch control mechanism is effected more slowly inasmuch as the bell crank lever 124 is operated as a throttle operating lever of the first class; the levers 90 and 124 moving as a unit about the pin 126; and by virtue of this operation the degree of clutch engaging movement of the valve member 30 is relatively small compared to the degree of movement of the accelerator to effect said movement. It is also to be remembered that the first stage of clutch engaging operation of the clutch is, with a normal operation of the accelerator, completed before or at substantially the same time as the opening movement of the throttle is initiated. The adjustable stop 42 serves to control the mechanism to limit the clutch plate loading factor said factor preferably being such as to prevent a stalling of the engine.

The clutch being engaged and the accelerator partially depressed the driver then further depresses the accelerator to speed up the vehicle with the transmission established in low gear; and when the desired vehicle speed is attained the driver will then release the accelerator preparatory to establishing the transmission in a higher gear ratio setting.

There is thus provided, by the friction clutch control mechanism of my invention, power means for effecting the disengagement of the clutch when the accelerator is released to idle the engine and the transmission is established in any one of its low, reverse, or second gear settings; or when the accelerator is released to idle the engine, the vehicle is traveling below governor speed or is at rest, and the transmission is established in its high gear setting. In the latter clutch disengaging operation of the power means the accelerator, in its operation of the three-way valve 28, 30, cooperates with the governor in its operation of closing the switch 74 and the accelerator 118 in its operation of closing the switch 73, the latter operation being effected when the throttle is slightly opened thereby providing means for driving the vehicle in high gear at a relatively low vehicle speed. As to the clutch engaging operation of the power means of my invention, said operation is effected, through the intermediary of the floating lever 36, by an operation of the accelerator and an operation of the valve operating motors 45 and 23. It is also to be noted that with the clutch control mechanism of my invention if the driver should fail to depress the accelerator to operate the valve 28, 30 just after the transmission is established in its high gear setting, that the bleed of air into the motor 10 via the duct 66 will nevertheless insure an engagement of the clutch. This operation of the mechanism might be effected if the transmission were placed in its high gear setting just before the vehicle started to descend a grade.

The valve mechanism of my invention which is the most important feature thereof, insures a two stage operation of the clutch motor and a resulting smooth engagement of the clutch, with any mode of operation of the accelerator; for the operation of the leverage changing force transmitting connections and the throttle spring 145 virtually insure this two stage operation of the mechanism when the clutch is engaged as a result of a normal operation of the accelerator. The floating lever 36 interconnecting the reciprocable valve member 30 with the accelerator operated pin 41 and the power elements of the valve operating motors 23 and 45, provide a very simple, yet effective, means for operating the three-way control valve 28, 30; the varying of the weight of the spring 47 provides a means for determining when the first stage of engagement of the clutch is completed; the particular force transmitting means interconnecting the throttle valve, the valve member 30 and the accelerator 118 insures a completion of the first stage of engagement of the clutch just as the throttle is opened or is about to be opened; the step by step clutch engaging or disengaging operations of the power element of the clutch motor insures the desired maneuvering of the vehicle in traffic, or when the vehicle is being parked; and the operation of the motor 23 provides a means cooperating with the accelerator to effect a concurrent engine torque controlling means and accelerator position controlling means for determining the clutch plate loading operation of the clutch motor 10. It is desirable to load the clutch plates in accordance with the position of the accelerator pedal; and it is also desirable to make said loading a function of the engine torque. With the clutch control mechanism of my invention the clutch plate loading is a function of both of the aforementioned factors.

Figure 6:
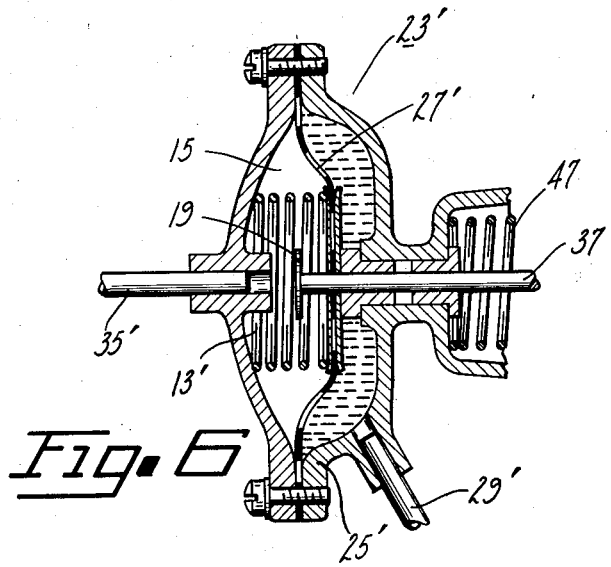
Figure 6 is a view disclosing a portion of the valve mechanism of Figure 3 modified to provide another embodiment of the control valve mechanism of my invention.

There is disclosed in Figure 6 a modified form of valve controlling motor; and the parts of said motor which duplicate like parts in the motor 23 of Figure 3, are given the same reference numeral with the addition of a prime. The motor of Figure 6 differs from that of Figure 3 in the inclusion of a spring 13' housed within a compartment 15 of the motor; and by the provision of a lost motion connection between a power element 27' and a rod 37' the latter being slidable through the power element. A flange 19 is fixedly mounted on the rod 37' and said flange is adapted to abut the power element 27' when said element is moved to the left as described below.

Describing the operation of the motor 23' of Figure 6 the parts of the mechanism are shown in their positions when the engine is idling. The spring 13' then serves to move the power element 27' to the right to separate the flange 19 from said element. With a normal clutch engaging operation of the mechanism of my invention the pin 37' will move to the right in the valve lapping operation; and this movement will not be obstructed by the power element 27'. However, should the driver inadvertently or by design suddenly open the throttle to accelerate the vehicle and thereby appreciably accelerate the speed of the engine, then it would be desirable to delay the lapping of the valve until the clutch plates were appreciably loaded, that is, loaded sufficiently to effect the desired acceleration of the vehicle; and with the control mechanism of Figure 6 this result will be accomplished inasmuch as with the aforementioned speeding up of the engine there results sufficient fluid pressure upon the power element 27' to overcome, that is compress, the spring 13' thereby moving the power element to the left. The power element 27' by this operation springs into action as a yieldable stop to resist the movement of the pin 37' to the right thereby delaying the lapping operation of the valve; and this delay results in the admission of a greater quantity of air into the control chamber 13 of the clutch motor thereby effecting a more substantial loading of the clutch plates. There is thus provided, by the motor 23', means for automatically increasing the clutch plate loading operation of the mechanism should the speed of the engine be increased to or above a certain critical factor.

Although only two embodiments of the invention have been illustrated and described, various changes in the form and relative arrangements of the parts may be made to suit requirements.

I claim:

1. Clutch control mechanism adapted to be included in the power plant of an automotive vehicle, said mechanism including a fluid pressure motor, valve means for controlling the operation of said motor including a pressure balanced valve member and means for actuating said member including force transmitting means adapted to be connected to the accelerator of the vehicle and further including a fluid pressure motor operable in accordance with the pressure fluid therein, together with another fluid pressure motor operable in accordance with the speed of the engine of the vehicle.

2. Mechanism for operating the friction clutch of an engine driven vehicle comprising a fluid pressure motor, valve means for controlling the operation of said motor including a pressure balanced reciprocable valve member, and means for controlling the operation of said valve member including manually operable means for moving said valve member, a spring and pressure differential operated motor for moving said valve member, and a fluid pressure operated motor operable in accordance with engine speed and operative to control the operation of said pressure differential operated motor.

3. Mechanism for operating the friction clutch of an engine driven vehicle comprising a fluid pressure motor, valve means for controlling the operation of said motor including a pressure balanced reciprocable valve member, and means for controlling the operation of said valve member including a lever member pivotally connected to the valve member, manually operable means connected to one end of said lever member and operable, through the intermediary of the lever member, to move said valve member, a pressure differential operated motor for moving said valve member, said motor also being connected to the lever member, and a spring and fluid pressure operated motor operable in accordance with engine speed and operative to control the operation of said pressure differential operated motor.

4. Mechanism for operating the friction clutch of an engine driven vehicle comprising a fluid pressure motor operably connected to the driven element of the clutch, valve means for controlling the operation of said motor including a reciprocable pressure balanced valve member, a lever member pivotally connected to one end of said valve member, manually operable means pivotally connected to one end of the lever member, a spring and pressure differential operated motor including a power element operably connected to the other end of the lever member, a water pressure operated motor including a power element operably connected to the power element of the last mentioned motor, a spring within the water pressure operated motor, said spring serving to render said motor operable as a control means when and only when the power element of the water pressure operated motor is subjected to a hydrostatic force equal to or exceeding a certain factor.

5. Mechanism for operating the friction clutch of an engine driven vehicle comprising a fluid pressure motor operably connected to the driven element of the clutch, valve means for controlling the operation of said motor including a reciprocable pressure balanced valve member, a lever member pivotally connected to one end of said valve member, manually operable means pivotally connected to one end of the lever member, a spring and pressure differential operated motor including a power element operably connected to the other end of the lever member, a water pressure operated motor including a power element operably connected to the power element of the last mentioned motor, and a spring within the water pressure operated motor, said spring serving to render the motor operable as a control means when and only when the power element thereof is subjected to a force equal to or exceeding a certain factor.

EARL R. PRICE.

REFERENCES CITED

The following references are of record in the file of this patent:

UNITED STATES PATENTS

| Number | Name | Date |
| --- | --- | --- |
| Re. 21,828 | Fleischel | June 17, 1941 |
| 1,964,693 | Hill | June 26, 1934 |
| 2,052,428 | Tyler | Aug. 25, 1936 |
| 2,114,221 | Gillett | Apr. 12, 1938 |
| 2,208,865 | Gette | July 23, 1940 |
| 2,324,830 | Eaton | July 20, 1943 |
| 2,391,192 | Price | Dec. 18, 1945 |